(12) United States Patent
O'Connor et al.

(10) Patent No.: US 6,318,544 B1
(45) Date of Patent: Nov. 20, 2001

(54) CHANGING THE CHARACTERISTICS OF AN ARTICLE-CONVEYING BELT SURFACE ON A RUNNING CONVEYOR

(75) Inventors: Gerald M. O'Connor, Mandeville; Robert S. Lapeyre, New Orleans; Christopher G. Greve, Covington, all of LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/434,824

(22) Filed: Nov. 5, 1999

(51) Int. Cl.[7] .................................................. B65G 17/38
(52) U.S. Cl. .......................................... 198/853; 198/779
(58) Field of Search ........................... 198/370.09, 370.1, 198/456, 779, 850, 851, 853, 838, 845, 608.1

(56) References Cited

U.S. PATENT DOCUMENTS

| | | | | |
|---|---|---|---|---|
| 4,004,682 | * | 1/1977 | Scruler | 198/853 X |
| 4,880,107 | * | 11/1989 | Deal | 198/853 X |
| 5,238,099 | | 8/1993 | Schroeder et al. | 198/456 |
| 5,261,525 | * | 11/1993 | Garbagnati | 198/853 X |
| 6,148,990 | * | 11/2000 | LaPeyre et al. | 198/853 X |

FOREIGN PATENT DOCUMENTS

WO 99/48779   9/1999   (WO) .............................. B65G/17/46

OTHER PUBLICATIONS

Ammeraal, Ltd., product brochure, "Ammeraal introduces the Amflights" publication date unknown.

* cited by examiner

Primary Examiner—James R. Bidwell
(74) Attorney, Agent, or Firm—James T. Cronvich (57) ABSTRACT

A belt conveyor whose article-conveying characteristics can be changed as the belt is running. The conveyor belt includes a plurality of movable assemblies supporting an article-supporting element and an adjustable element. The adjustable element coacts with an adjustment control element supported in the conveyor frame as the belt is running. The coaction causes the adjustable element to move the article-supporting element to provide a different article-conveying characteristic to articles supported at the conveying surface of the belt in zones defined by the adjustment control elements.

51 Claims, 9 Drawing Sheets

CHANGING THE CHARACTERISTICS OF AN ARTICLE-CONVEYING BELT SURFACE ON A RUNNING CONVEYOR

BACKGROUND

1. Field of the Invention

The invention relates to article conveyors generally and, more particularly, to conveyors having an article-conveying surface with article-engagement characteristics that can be changed while the conveyor is running.

2. Description of the Related Art

Conveyor belts are used widely to transport articles through plants. During its odyssey through a plant, an article encounters a variety of challenges. For example, the article may need to descend from one level to a lower level or to climb from the lower level to a higher level. To give the article some traction on an incline or to prevent it from sliding out of control down a decline, conveyor belts with rubber or other high friction materials on the conveying surface are used. At other places in the plant, a number of articles must be accumulated because, for example, a downstream process is proceeding more slowly than an upstream process. To prevent the accumulating articles from crushing each other as the conveyor belt continues to move, a belt having rollers providing a low-friction conveying surface is used. The rollers allow the belt to slide past the undersides of the accumulated articles with little backline pressure. Sometimes it is necessary to space the articles from each other. Singulators with a controlled gate are often used to separate conveyed articles from each other. Finally, an article's journey through the plant ends. Often the article is pushed off the side of the belt onto a platform for shipment. A belt with rollers capable of rotating in a direction to aid a side-off transfer is useful in this application.

The response to one challenge confronting the article as it travels through the plant is often incompatible with the other challenges. Consequently, the common solution is to use a series of conveyors each having a conveying surface characteristic suited to overcoming the particular challenge. But this solution requires a number of different-style belts, more belt drive systems, and more plant space to handle the additional feet of belt, drive components, and transfer mechanisms required. Thus, there is a need for a conveyor system that can handle combinations of these conflicting transport requirements of high-friction conveyance, low-friction conveyance, side-off transfer, low backline pressure, and product separation.

SUMMARY

This need and others are solved by a conveyor system having features of the invention. Such a conveyor includes a conveyor frame supporting a driven conveyor belt. The belt includes an outer conveying surface and an opposite inner surface. An opening is formed in the outer surface. A movable assembly is disposed in the opening. The movable assembly includes an article-supporting element that is capable of being positioned above the outer conveying surface to support conveyed articles and an adjustable element at or below the inner surface of the belt. An adjustment control element supported in the conveyor frame coacts with the adjustment element as the belt is running. The coaction causes the adjustment element to move the movable assembly and the article-supporting element into a different relationship with the supported articles to provide them with a different conveying characteristic. In this way, a single belt can be used to provide conveyed articles with different conveyor characteristics along the conveying path to meet various requirements.

In one version, the movable assembly is a retractable assembly that includes a retractable element that is movable from a first retracted position within the opening and below the conveying surface to a second salient position above the conveying surface. The conveyor frame supports a bearing member close to the inner surface of the belt along a portion of the conveying path. The bearing member bears against the retractable assembly to urge the retractable element from the first retracted position to the second salient position to support conveyed articles from below. Thus, by positioning bearing members at strategic locations along the conveying path, one can "program" the belt to present a different characteristic to supported articles where needed.

Different versions of conveyors having features of the invention have different retractable assemblies and elements. In one version, the retractable assembly is a cradle-mounted roller. By bearing against a camming surface of the cradle, the bearing member forces the roller through the opening above the upper surface of the belt to provide rolling contact to conveyed articles. Depending on the orientation of the roller's axis of rotation, this version is useful for low backline pressure or side-off transfer.

According to yet another version, the retractable assembly includes an adjustable rotatable wheel below the inner surface of the belt. An adjustment control rack of predetermined length in the direction of belt travel is supported in the conveyor frame near the inner surface of the belt. The forward motion of the belt causes the wheel and the retractable element to rotate about an axis normal to the conveying surface as the wheel rides along the rack. The length of the rack determines the extent of the rotation of the retractable element. In one embodiment, the wheel includes a set of circumferentially arranged gear teeth. The rack includes a set of teeth that mesh with the wheel's teeth to rotate the retractable element to a known orientation. By selecting the length of the rack, the amount of rotation of the retractable element can be set for the application. In the case of a cylindrical roller, its axis of rotation relative to the direction of belt travel can be adjusted. In this way the conveyor can be set with the axis of rotation of the roller transverse to the direction of belt travel for low backline pressure or oblique for side-off transfer.

In yet another version of the invention, the retractable member is a ball rotatably retained in the retractable assembly. According to one version, the ball can be urged to the second salient position by an arm pivotable at one end and having two camming surfaces at the other end. The bearing member bears against one of the camming surfaces to pivot the arm causing the other camming surface to push the retractable element into the second salient position.

The versions using rollers and rotatable balls, both providing low friction support for conveyed products, are useful with high-friction conveying surfaces. When the retractable elements pop up above the high-friction conveying surface, the belt surface characteristic experienced by the conveyed articles is transformed from high friction to low friction in a zone determined by the placement of the bearing members. In this way, a single belt can be programmed into zones having vastly different characteristics along the conveying path.

In another version of the invention providing article separation, the retractable assembly includes a pair of braces supporting a rotatable roller. The bearing member bears against the roller to push the assembly upward into the second salient position and to actively rotate the roller as the belt moves. Because the roller rotates relative to the belt conveying surface, articles coming into contact with the tops of the rotating rollers are accelerated. The acceleration causes consecutive articles to separate from each other in the direction of belt travel.

In yet another version, the retractable assembly includes a shoe having non-rolling upper shoe structure protruding above the conveying surface of the belt when the bearing member forces the shoe into the second salient position. The upper shoe structure is preferably made of a high-friction material. Thus, when the shoe is forced into the salient position, the belt's conveying characteristic is converted into high friction for incline and decline applications, for instance.

In any of the embodiments, biasing means, such as a spring, residing in the opening can be used to bias the retractable element toward the first retracted position. This keeps the retractable element out of the way inside the opening when it is not needed.

In a modular conveyor belt according to the invention that includes a series of rows of belt modules hingedly linked together by hinge pins through aligned apertures in hinge elements at the ends of each row, the retractable assembly includes, in one version, a passageway aligned with the apertures of a row and encompassing the hinge pin, which acts as a pivot about which the retractable assembly pivots.

The bearing member may be realized in various ways according to the invention. In one version the bearing member is a flat wearstrip surface positioned to coact with the retractable assemblies in preselected zones to raise the retractable elements. The wearstrip could include a sloping portion that gradually bears against the retractable assemblies to prevent the retractable element from popping up too suddenly. In a more sophisticated version, the bearing member could be controlled by a mechanism, such as a pneumatically controlled bladder or cylinder that raises the bearing member on command. In conjunction with a control system, such a mechanism enables more control options.

Thus, the conveyor system having features of the invention allows the use of a single conveyor belt in applications requiring a variety of conveying surface properties. By positioning bearing surfaces at specified locations along the conveying path to activate pop-up elements in the belt, one can design a conveyor to meet a variety of conveyance requirements.

BRIEF DESCRIPTION OF THE DRAWINGS

These and other advantages, features, and aspects of the invention are better understood by referring to the following description, claims, and drawings, in which:

DESCRIPTION OF THE EMBODIMENTS

Figure 1:
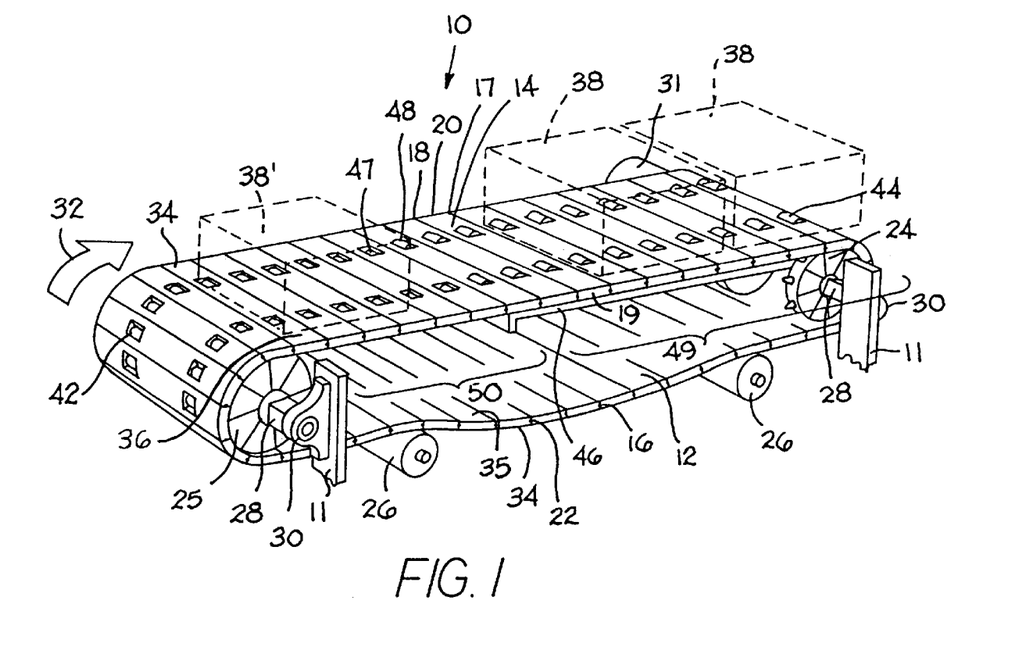
FIG. 1 is a partial top perspective view of one version of a conveyor and belt with pop-up rollers according to the invention.

An exemplary conveyor having features of the invention is shown in FIG. 1. The conveyor 10 includes a conveyor frame 11 supporting a conveyor belt 12. The belt shown is in the form of an endless conveyor belt consisting of a series of rows 14 of belt modules linked together by hinge pins 16. Each row extends along the conveying path from a first end 17 to a second end 18 and across the width of the row from a first side edge 19 to a second side edge 20. Each row may comprise one or more belt modules. Hinge elements along the first and second ends of each row include aligned apertures 22 for a hinge pin acting as a journal to allow the belt to articulate about drive sprockets 24, idler sprockets 25, and returnway support rollers or drums 26.

The sprockets 24, 25 are mounted on shafts 28 rotatably supported by bearing blocks 30 at each end. A motor 31 drives the shaft 38 of the drive sprockets 24 to move the belt in the direction of belt travel indicated by arrow 32. (The motor could also be reversed to reverse the direction of belt travel, if necessary.) The motor, shaft, and sprockets together are part of the drive means of the belt and are supported by the conveyor frame.

The belt forms an outer conveying surface 34 and an opposite inner surface 35. Articles 38 are conveyed on the outer conveying surface along a top carryway 36 in the direction of arrow 32. Openings 40 onto the conveying surface are formed in the belt. A movable retractable assembly 42 resides in each opening. The retractable assembly includes a retractable article-supporting element, such as a pop-up roller 44, that can be moved from a first retracted position within the opening and below the outer surface of the belt to a second salient position above the conveying surface. (To simplify the drawing, the retractable assemblies are not shown in the lower returnway path of the conveyor belt.) Acting as an adjustment control element, a bearing member, such as a flat wearstrip surface 46 made of metal or a durable plastic such as a UHMW (ultra-high molecular weight) plastic, contacting the inner surface 36 of the belt in line with the retractable assemblies, pushes the retractable element from its retracted position 47 to its salient position 48. In this way the articles 38 are supported by rollers 44 in a salient position protruding above the belt's outer conveying surface. Rollers having an axis of rotation transverse to the direction of belt travel slip past the supported articles 38 with little friction. This allows the articles to accumulate with low backline pressure in an accumulation zone 49 in which the rollers are in a salient position giving the belt a low-friction conveying surface characteristic. Where the rollers are in a retracted position, the conveying surface forms a zone 50 characterized by the frictional properties of the surface material, which could range from low to high friction. Thus, by selecting a belt surface material and retractable elements having a different characteristic, and by positioning bearing surfaces at strategic locations along the path, a conveyor having different conveying characteristics can be made with a single belt.

Figure 2:
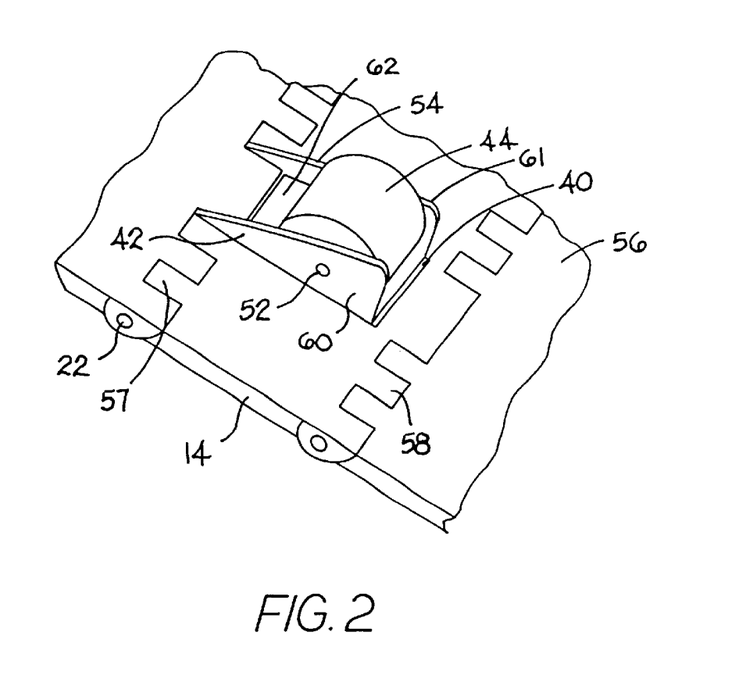
FIG. 2 is a partial top perspective view of a few rows of the conveyor belt of FIG. 1.
Figure 8:
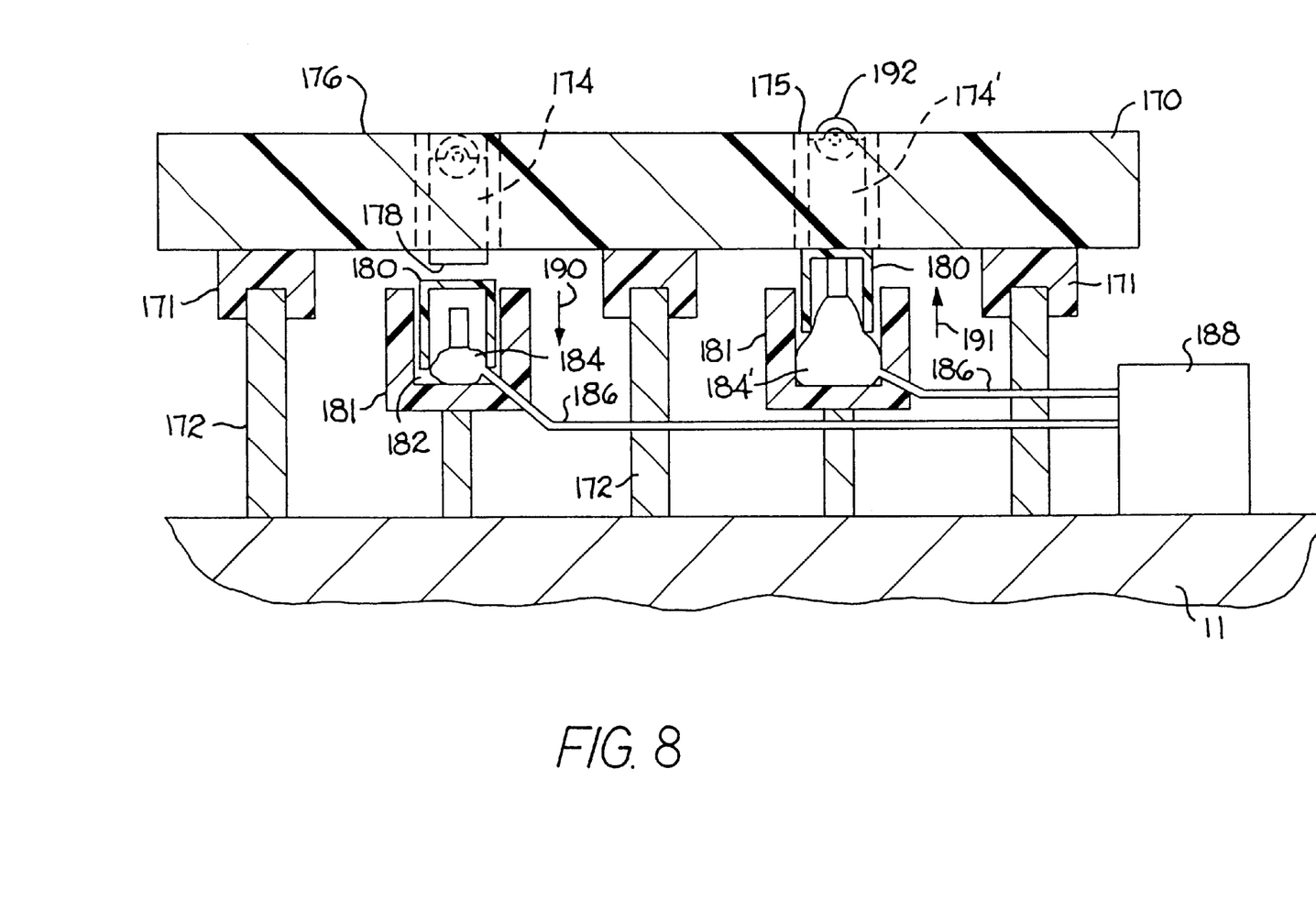
FIG. 8 is a partial sectional end elevation view of a conveyor according to the invention showing another mechanism for controlling conveying characteristics.

The pop-up roller version of FIG. 1 is shown in more detail in FIG. 2 in its salient position. The retractable assembly 42 shown includes a cylindrical roller 44 supported on an axle 52 in a cradle 54. The assembly is shown near a side edge of a modular belt consisting of rows 14 of belt modules 56 having a first group of hinge elements 57 along a first end of the row and a second group of hinge elements 58 along the second end of the row. The hinge elements circumscribe apertures 22 aligned along the width of the belt. The first group of hinge elements is interleaved with the second group of hinge elements of an adjacent row. A hinge pin (not shown in FIG. 2) extends through the aperture to link consecutive rows of belt modules into a conveyor belt. As shown, the axis of the axle is parallel to the axis of the hinge pin. As shown in FIG. 8, the axis of the axle could be perpendicular or oblique to the axis of the hinge pin. The cradle 54 resides in an opening 40 in the module. The cradle has two sides 60, 61 flanking the roller and supporting it on its axle 52. Connecting structure 62 joining each side adds strength to the cradle. The axle may be a single axle entirely through the roller or may be roller stubs extending out of or into the roller. The roller may rotate about the axle fixed in the sides of the cradle or with the axle rotatably retained in the sides of the cradle. What is important is that the roller be able to rotate relative to the cradle while the roller is in the second salient position.

Figure 3:
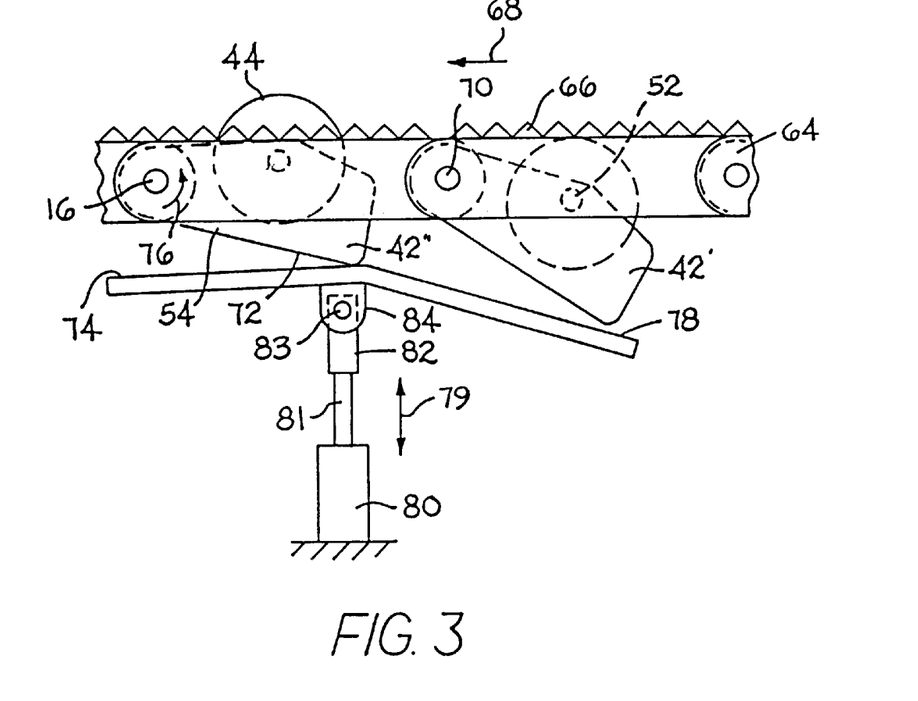
FIG. 3 is a partial side elevation view of a conveyor as in FIG. 1 with a high-friction conveying surface and a controllable bearing member.

As shown in FIG. 3, a belt 64 with a high-friction outer conveying surface 66 travels in the direction of arrow 68. The retractable assembly 42 includes a cradle 54 and a roller 44 as a retractable element rotating with an axle 52. At one end of the sides 60, 62 of the cradles are aligned eyes 70. The ends including the eyes interfit with the hinge elements and admit the hinge pin through them to form a pivot axle for the cradle. The lower surface 72 of the cradle acts as an adjustable camming surface that engages a bearing surface 74. The unengaged retractable assembly 42' rests in a retracted position with the retractable roller below the surface of the belt. As the belt moves in the direction of travel, the lower camming surface 72 eventually contacts the bearing surface 74, rotating the retractable assembly 42" about the hinge pin 16 in the direction of the curved arrow 76 into a salient position in which the retractable roller protrudes above the outer conveying surface. Thus, the conveying characteristics are converted from high-friction to roller-top by engagement of the stationary bearing surface with the camming surface of the retractable assembly. The bearing surface 74 further includes a sloped portion 78 that allows the retractable roller to rotate gradually and smoothly from its retracted position to its salient position above the conveying surface.

For even greater control of the conveying characteristics, the bearing surface can be moved up and down in the direction of arrow 79 into and out of contact with the camming surface. A pneumatic or hydraulic cylinder 80, for example, attached to the frame has an extensible push rod 81 with a joining member 82 at one end. The joining member 82 is attached to a tab 84 of the bearing member by means of a pin 83. Depending on the changing requirements of the conveying operation, the cylinder can move the bearing member up into a stationary position to engage the camming surface to a greater or lesser degree to control the amount of protrusion of the roller above the conveying surface or down completely out of contact with the camming surface for complete roller retraction.

Figure 4:
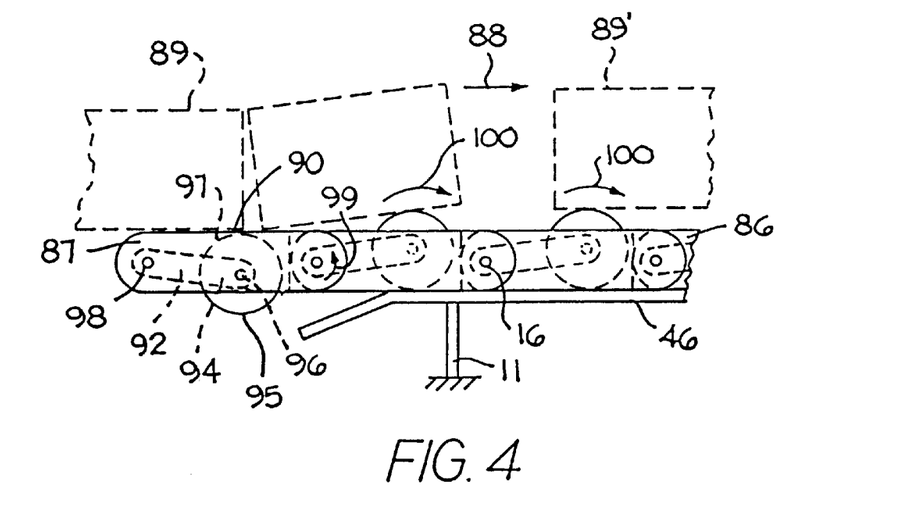
FIG. 4 is a partial side elevation view of a conveyor as in FIG. 1 showing pop-up rollers for product separation.

Another embodiment of the invention is shown in FIG. 4. A series of rows of belt modules 86 are hingedly linked by hinge pins 16 to form a belt 87 traveling in the direction of arrow 88. Articles 89 are tightly packed at the left end of the conveyor of FIG. 4 supported directly on the belt's conveying surface 90. A retractable assembly 92 comprising a pair of opposing braces 94 supporting a cylindrical roller 95 on an axle is shown on the left in a retracted position with the roller fully resident within a cavity 97 opening onto the conveying surface. With the retractable roller beneath the conveying surface, the conveyed articles are supported directly by the outer conveying surface of the belt. As the belt travels in the direction of arrow 88, the retractable assembly, whose braces interfit with the hinge elements of the roller and include aligned holes 98 that form a passageway with the hinge elements for the hinge pin 16, coacts with the upper bearing surface of the wearstrip. This coaction between the wearstrip, acting as a bearing member, and the roller forces the retractable assembly to rotate upward about the hinge pill, according to arrow 99, into a salient position in which an upper portion of the retractable roller protrudes above the conveying surface. The forward motion of the belt along the bearing member also causes the rollers to rotate in the direct on of arrows 100. Articles 89' in contact with the rotating rollers are propelled forward along the belt at a speed faster than the belt itself, which causes the articles to separate from each other in the direction of belt travel. Thus, product separation can be achieved with this version of the retractable assembly.

Figure 5:
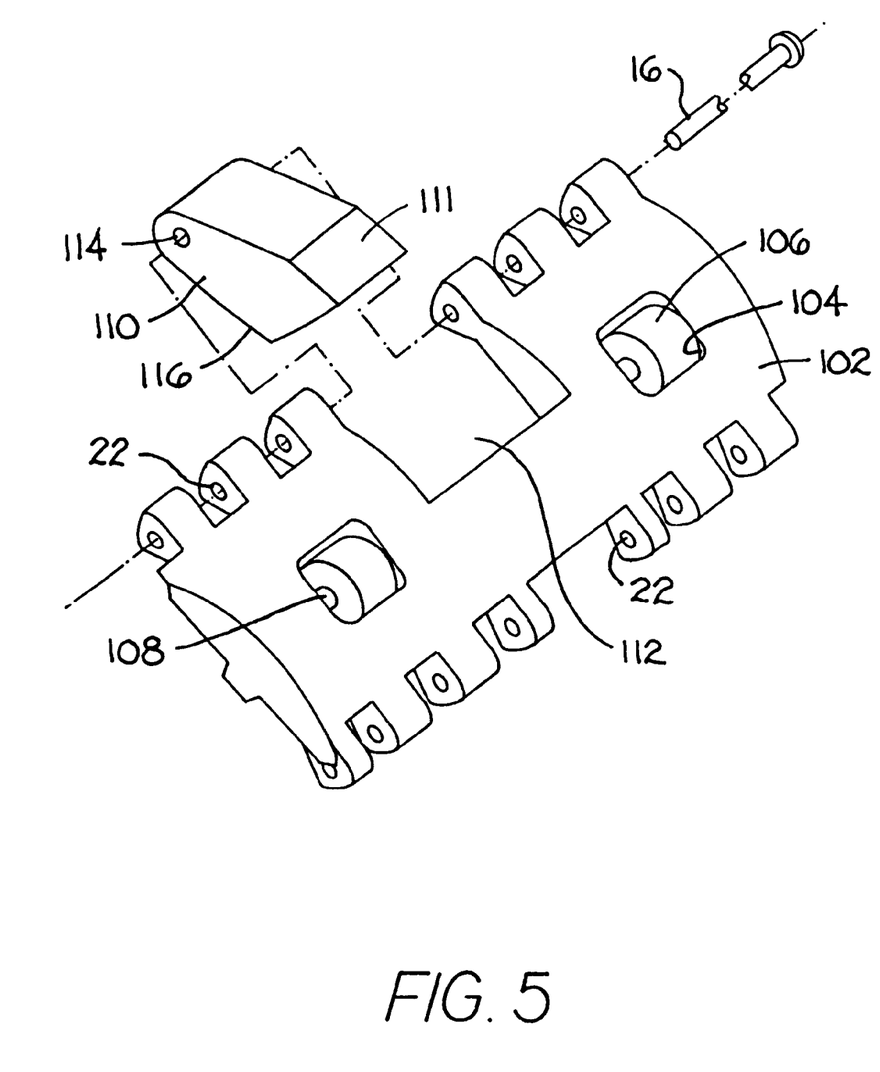
FIG. 5 is a top perspective view of a belt module for a conveyor according to the invention showing a roller-top surface and a retractable high-friction shoe.

Changing a belt's conveying characteristics from low-friction rolling contact to high-friction contact is illustrated by the belt module 102 in FIG. 5. The module shown is one of many similar modules that are interlinked by hinge pins 16 through apertures 22 to form a conveyor belt. The module 102 includes recesses 104 partly housing rollers 106. A top portion of the rollers extends above the conveying surface to support articles in rolling contact. The rollers rotate about an axle 108 supported in sidewalls of the recess. A retractable assembly comprising a shoe 110 having a non-rolling upper shoe structure 111 preferably made of a high-friction rubber or rubber-like material fits in an opening 112, which extends from one end of the module toward the other end. The shoe includes a passageway 114 that aligns with the hinge apertures to admit the hinge pin. The shoe rotates about the hinge pin. A bearing member, such as a wearstrip, beneath the inner surface of a belt made of such nodules bears against the bottom camming surface 116 of the shoe to rotate it about the axis of the passageway from a first retracted position not supporting conveyed articles to a second salient position in which the retractable upper shoe structure protrudes above the tops of the rollers to change the conveying characteristic to high-friction. Where the bearing member is not present along the conveying path, the conveying characteristic reverts to low friction rolling contact with conveyed articles.

Figure 6A:
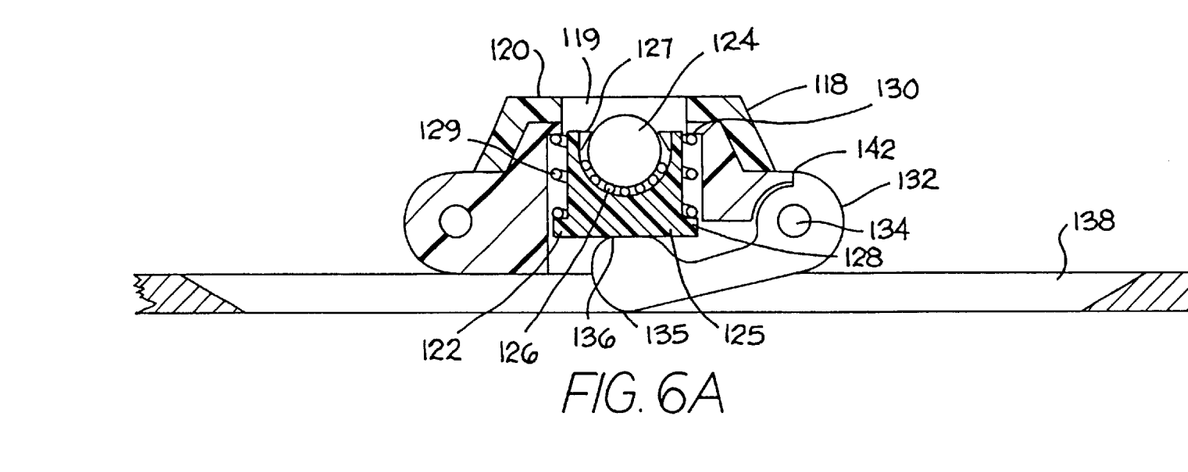
FIG. 6A is a side sectional elevation view of another version of a conveyor according to the invention showing a rotatable ball in a retracted position.
Figure 6B:
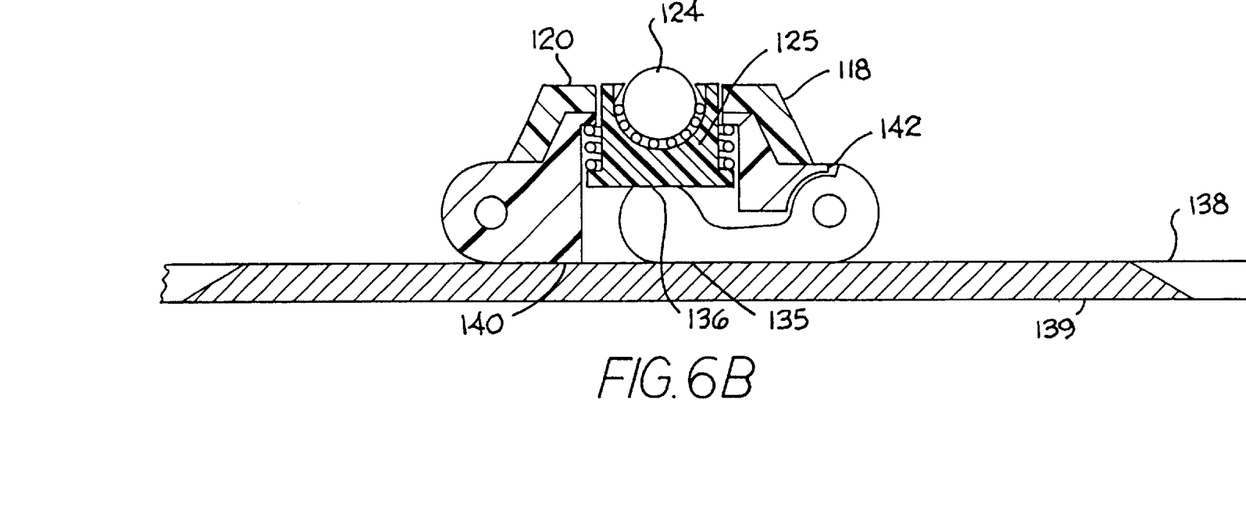
FIG. 6B is a side sectional elevation view of the conveyor in FIG. 6A showing the ball in a salient position.
Figure 7A:
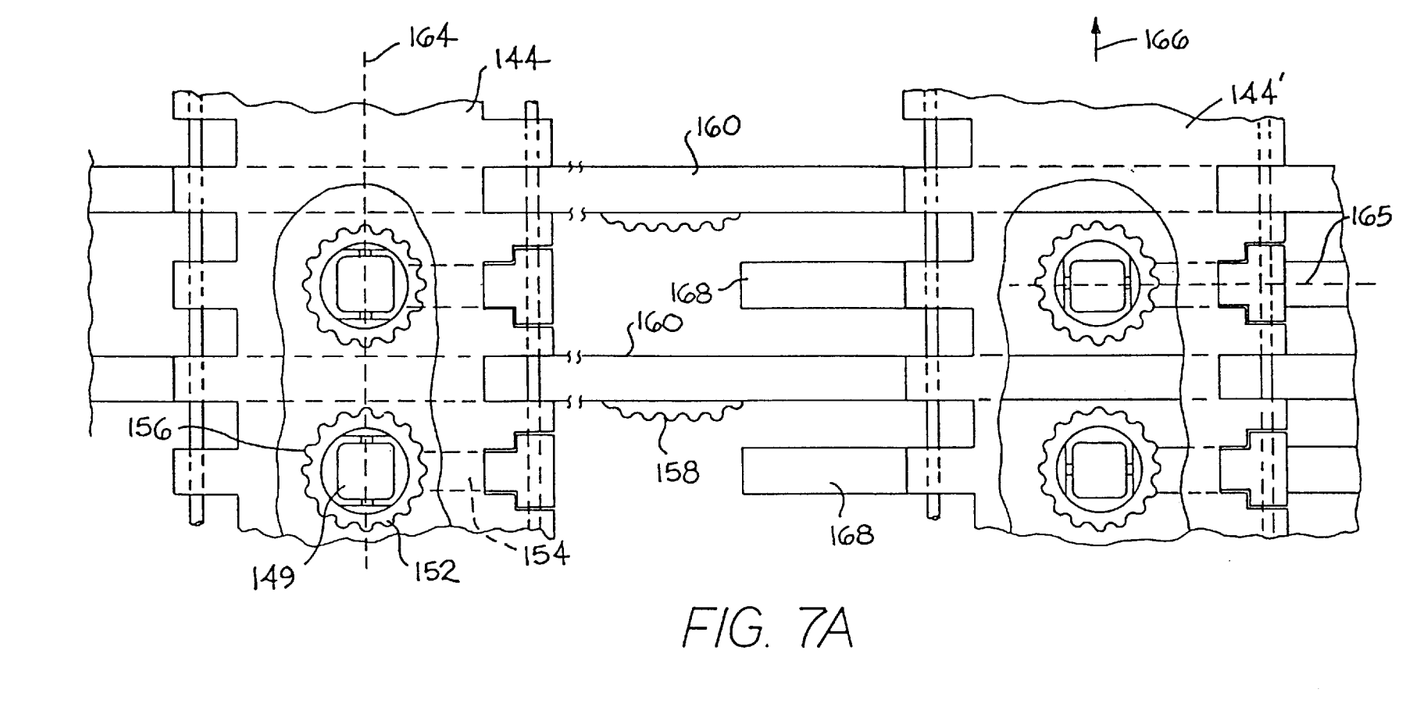
FIG. 7A is a partial top plan view, partly cut away, of another version of conveyor as in FIG. 1 showing roller-axis reorientation.
Figure 7B:
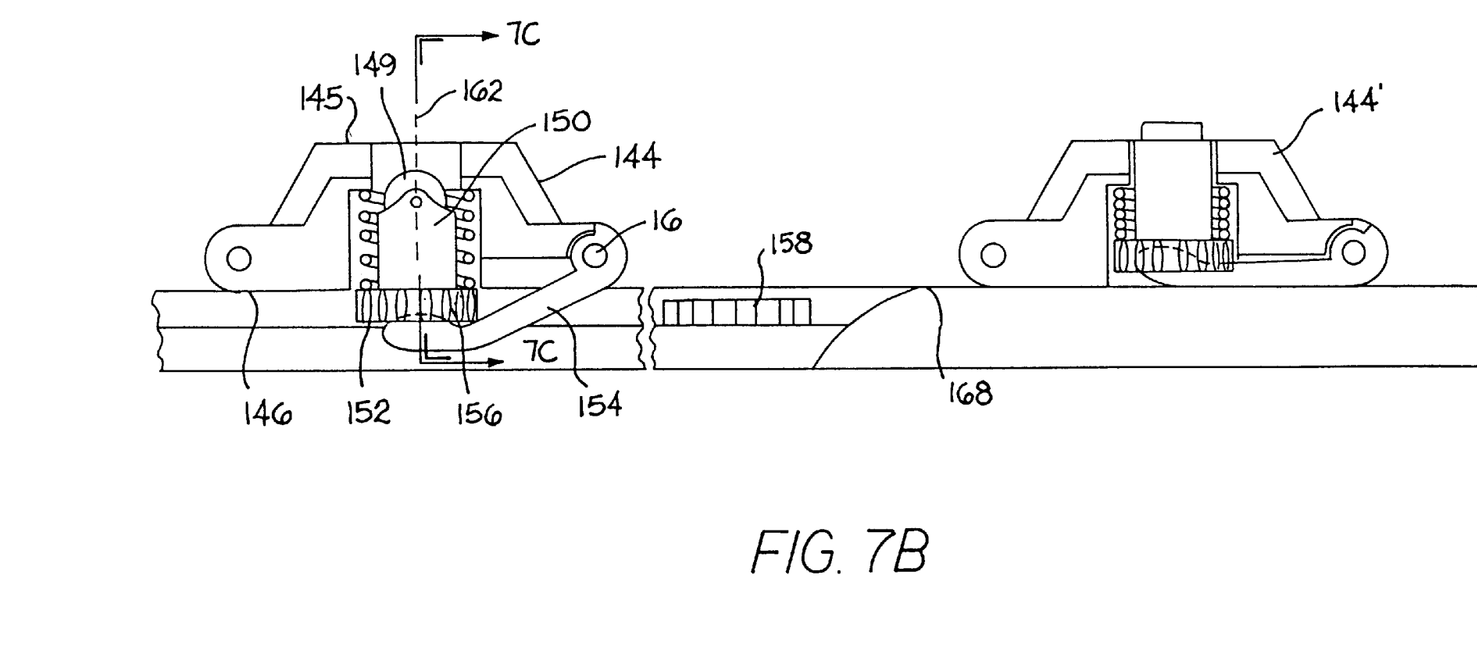
FIG. 7B is a sectional side elevation view of the conveyor of FIG. 7A.
Figure 7C:
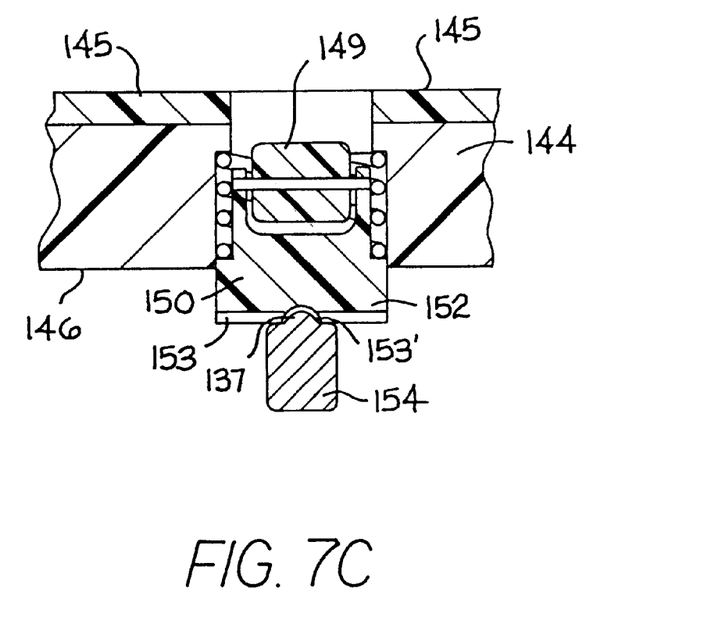
FIG. 7C is a partial cross-section of the conveyor of FIG. 7A taken along cut line 7C—7C of FIG. 7B.
Figure 7D:
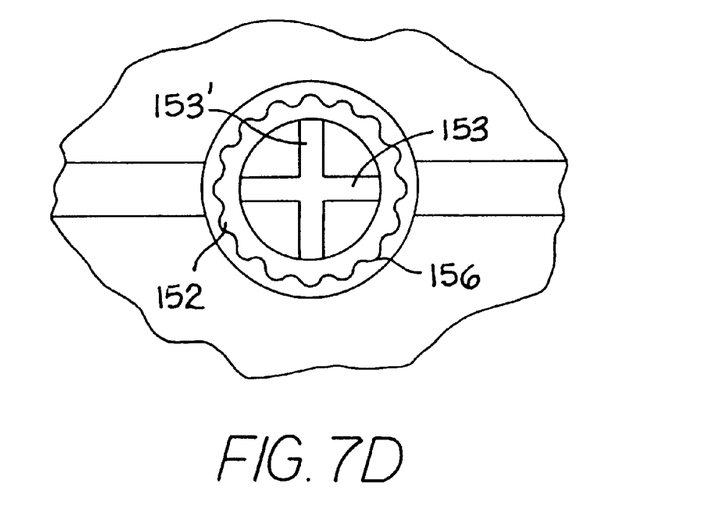
FIG. 7D is a partial bottom view of the conveyor of FIG. 7A with the swing arm removed for clarity.

FIGS. 6A and 6B show still another version of a conveyor having features of the invention. Only one row of the conveyor belt is shown for simplicity. Each row of the belt includes a module 118 having an opening 119 onto the conveying surface 120. A retractable assembly 122 includes a ball 124 freely rotatably supported in a cup 125 on ball bearings 126. A lip 127 around the rim of the cup retains the ball in the cup. A flange 128 at the bottom of the cup supports in the opening 118 biasing means, such as a coil spring 129, a stack of Belleville washers, or any clement or built-in structure tending to bias the retractable ball into a retracted position. A shoulder 130, built into the wall of the opening retains the spring around the cup. The retractable assembly further includes an arm 132 with an eye 134 at one end and a pair of camming surfaces 135, 136 at the other end. The eye end of the arm fits between the interdigitated hinge elements of adjacent modules. A hinge pin through the hinge elements and the eye of the arm forms an axis of rotation for the retractable assembly. The belt is supported on a wearstrip 138 along the carryway. In FIG. 6B, the wearstrip is shown with an adjoining bearing member 139 just below the inner surface 140 of the belt in line with the arm of the retractable assembly. In FIG. 6A, the retractable assembly is shown in a retracted position with the arm pivoted down below the inner surface of the module The spring biases the retractable ball element downward below the outer conveying surface. A stop 142 formed in the module limits the pivot range of the arm. In FIG. 6B, the retractable assembly is shown in a salient position with the retractable ball protruding above the outer conveying surface 120. The engagement of the bearing member 139 with the lower camming surface 135 of the arm pivots the arm upward. The upper camming surface 136 of the arm urges the cup upward against sprint, pressure. The top of the retained ball extends above the outer conveying surface to support conveyed articles in freely rolling contact. The roller balls provide the advantages of omnidirectional rotation. Once again, the bearing members, which can be extensions of the wearstrip, are strategically located at predetermined positions along the carryway to provide operating zones with different conveying characteristics.

Yet another conveyor having features of the invention is shown in FIGS. 7A–7D. The belt modules 144, 144' have an outer conveying surface 145 and an inner surface 146. A retractable assembly 148 includes, as a retractable clement, a roller 149 pivotally mounted in a housing 150. The bottom of the housing terminates in a wheel 152. A swing arm 154, similar to the arm 132 in FIGS. 6A and 6B, is pivotable about the hinge pin 16 at one end and has camming surfaces 135, 136 at the other end. A ridge 137 protrudes from the upper camming surface 136. The periphery 156 of the wheel is positioned to engage a rack 158 extending from the conveyor frame or carryway wearstrip 160. As shown, engagement is possible only when the retractable element, in this case, the roller, is in its retracted position. The engagement between the wheel and the rack can be frictional, for instance, but is preferably achieved by a meshing of gear teeth for a more positive engagement. Teeth spaced circumferentially, around the periphery of the wheel mesh with linearly spaced teeth on the rack. As the module moves past the rack, the engaging teeth of the wheel and rack cause the roller to rotate about an axis 162 normal to the conveying surface. The degree of rotation depends on the length of the rack for a given tooth size. Such an arrangement permits the axis of the rollers to be rotated, for example, from one rotational axis 164, such as in module 144, conducive to low backline pressure, to another rotational axis 165, such as in module 144', conducive to side-off transfer of articles in the direction of arrow 166.

The swing arm 154 pivots upward when its lower camming surface 135 engages a bearing surface 168 close to the inner surface of the belt and in line with the arm. The upper camming surface 136 pushes the retractable element, e.g., a roller, upward against spring pressure into a salient position above the outer conveying surface to support conveyed articles in rolling contact along a preselected rolling axis. The ridge 137 registers in a radial slot 153 formed in the bottom of the retractable assembly as a detent mechanism to retain the retractable element in a predefined orientation. Other radial slots, such as orthogonal slot 153', could be formed in the bottom to set other predefined orientations. Thus one can change the orientation of the retractable element by the placement and length of racks along the conveying path and divide the conveying path into zones of different conveying characteristics starting downstream of each rack position.

Figure 9:
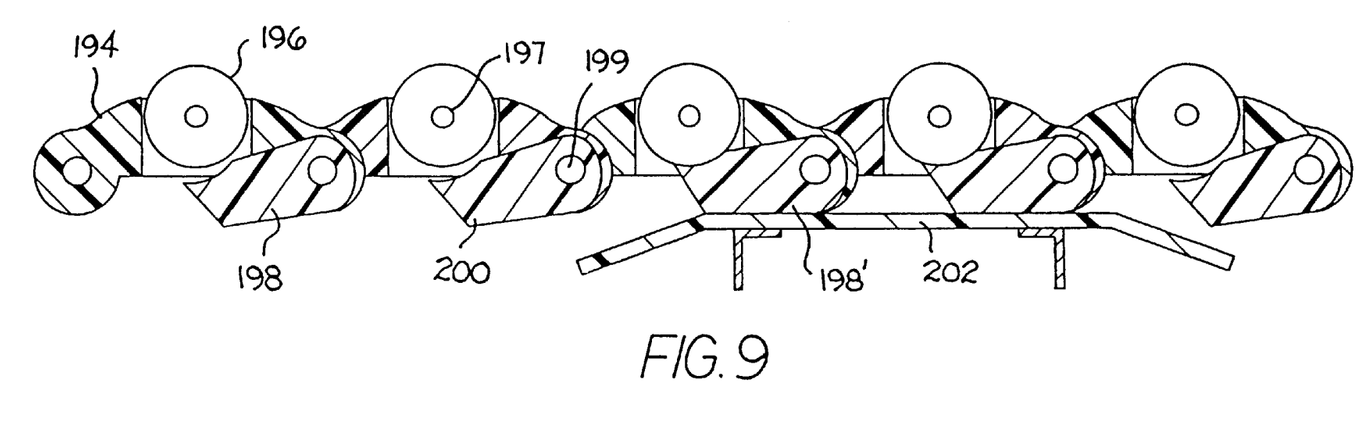
FIG. 9 is a sectional side elevation view of yet another version of a conveyor according to the invention showing rollers with a brake mechanism operative in a braking zone.
Figure 10:
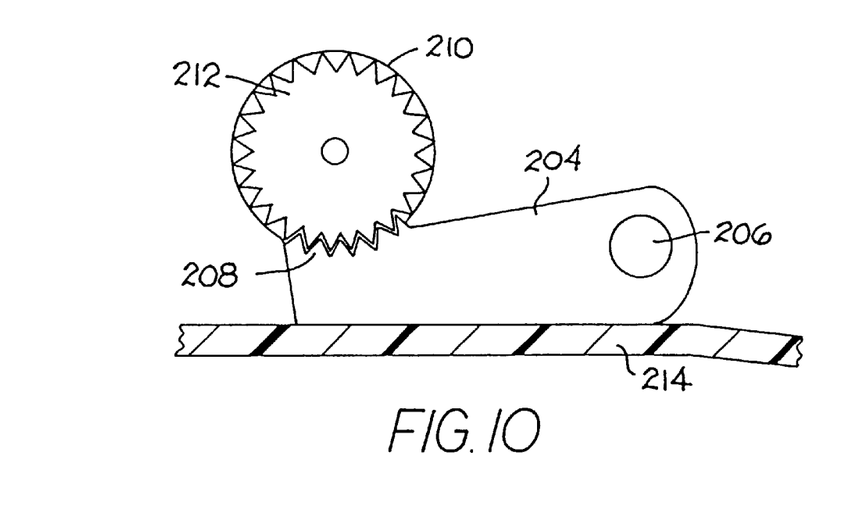
FIG. 10 is a sectional side elevation view of another version of brake mechanism useful in the conveyor of FIG. 9.

Although the wheel and rack are shown in FIGS. 7A–7D in connection with a retractable assembly, they would also work together with a rotatable assembly that is not retractable. An article-conveying element, such as a cylindrical roller or any movable or stationary element that has different characteristics alone different axes in the conveying plane, can be supported in the rotatable assembly in a salient article-supporting position above the outer belt surface. A rotational element, such as a wheel, linked to the article-conveying element by the rotational assembly, could engage a rotation control element just beneath the inner surface of the belt. The rotation control clement could be the rack shown in FIGS. 7A and 7B or could be a gear wheel actively rotated by a motor. In the case of the rack, the degree of rotation of the rotatable assembly is set by the length of the rack for a given tooth spacing. In the case of the motor-driven gear wheel, the degree of rotation is set by the speed of rotation of the gear wheel as it engages the rotational element. Yet another non-retractable assembly is shown in FIG. 9 in which a conveyor belt constructed of interlinked modules 194 includes article-engaging rollers 196 pivotally mounted on shafts 197. Arms 198 are attached to the belt by and pivot about hinge pins 199 linking the modules together. The ends of the arms opposite the hinge pins include a braking surface 200 preferably contoured to match the curvature of the rollers. When not in contact with an adjustment control element, such as a wearstrip 202, the arms hang below the bottom of the belt. When in contact with the wearstrip, the arms 198' are pushed up with the braking surface in frictional contact with the roller. In this way, the roller is prevented from rolling by the arms, which serve as brake members in a zone declined by the adjustment control element. The rollers may be made of a low-friction plastic material or a high-friction rubber or rubber-like material to achieve the desired conveying performance. Another brake mechanism is shown in FIG. 10, in which an arm 204 includes at the end opposite a hinge eye 206 a row of teeth 208. The roller 210 is concentrically arranged with an attached gear wheel 212 with teeth recessed inward of the circumference of the roller. With the arm in the braking position as shown, the adjustment control element 214 bears against the bottom of the arm pivoting it so that the teeth on the arm mesh with the gear wheel teeth and lock the roller against rotation. These are just other examples of controlling the conveying, characteristics of a conveyor belt according to the invention.

An alternative apparatus for controlling the positions of retractable elements is shown in FIG. 8. A belt 170 is supported by wearstrips 171 attached to frame members 172. Retractable assemblies 174, 174' reside in openings 175 onto the outer conveying surface 176 of the belt. The retractable assemblies have a bottom camming surface 178. U-shaped bearing members 180 mounted in a bearing support channel 181 form a hollow 182 for a bladder 184, 184'. Air lines 186 in communication with the interior of the bladders direct air from a controllable air source 188 into and out of the bladders. (The controllable air source could combine a programmable controller, an air compressor, and valves controlled by the controller.) As shown in FIG. 8, the retractable assembly 174 on the left is shown in a retracted position because the bladder 184 is deflated causing the bearing member to fall downward in the direction of arrow 190 and out of contact with the retractable assembly. The retractable element 192 of the retractable assembly 174' on the right is shown in a salient position above the outer conveying surface because the inflated bladder 184' fills the hollow and pushes the U-shaped bearing surface upward in the direction of arrow 191 to bear against the bottom camming, surface of the retractable assembly. In this way, even greater control of the conveying characteristics of the conveyor is possible.

Although the invention has been described in detail with reference to a variety of example versions exhibiting various combinations of features, those skilled in the art will readily appreciate that the features could be combined in still other combinations. For example, biasing means, such as a spring, could be incorporated into any of the retractable versions shown to ensure that the retractable assembly remains in its retracted position when its characteristics are not needed or on the returnway path of the conveyor. Non-rotatable high-friction retractable elements, such as domed protrusions, could replace the pop-up roller balls to provide a high-friction conveying characteristic. In the versions described, the retractable assemblies included a portion that pivoted about the hinge pin to force the rotatable element into a salient position above the conveying surface. It is also within the scope of the invention to include a dedicated pin, for example, apart from the hinge pin, to provide a pivot axis for the retractable assembly. The invention was described in the context of modular conveyor belts, especially modular plastic belts, but could also be used with other conveyor belts, such as fabric belts or fixed-width conveyor chains. As these examples suggest, these and other modifications and alternative embodiments are intended to be included within the scope of the invention as defined in the following claims.

What is claimed is:

1. A conveyor for conveying articles along a conveying path, comprising:
    a conveyor frame;
    a driven conveyor belt supported in the frame and including:
        an outer conveying surface and an opposite inner surface and forming an opening onto the outer conveying surface;
        a movable assembly at least partly housed in the opening and including an article-supporting element disposable above the outer conveying surface and an adjustable element disposed along the inner surface; and
    a stationary adjustment control element supported in the conveyor frame proximate the inner surface of the belt in a position to coact with the adjustable element to move the movable assembly and the article-supporting element to provide conveyed articles with a different conveying support characteristic.

2. A conveyor as in claim 1, wherein the movable assembly is a retractable assembly including a retractable article-supporting element and wherein the coaction of the adjustable element with the adjustment control element causes the retractable article-supporting element to move from a first retracted position with the article-supporting element below the outer conveying surface to a second salient position with the article-supporting element at least partly above the outer conveying surface to support conveyed articles.

3. A conveyor as in claim 1, wherein the coaction of the adjustable element with the adjustment control element rotates the movable assembly to change the orientation of the article-supporting element supporting conveyed articles.

4. A conveyor for conveying articles along a conveying path, comprising:
    a conveyor frame;
    a driven conveyor belt supported in the conveyor frame and including:
        an outer conveying surface and an opposite inner surface and forming an opening onto the outer conveying surface; and
        a retractable assembly including a retractable element movable from a first retracted position within the opening below the conveying surface to a second salient position above the conveying surface; and;
    a bearing member supported in the conveyor frame proximate the inner surface of the belt along at least a length of the conveying path, the bearing member bearing against the retractable assembly to urge the retractable element from the first retracted position to the second salient position above the conveying surface in underlying support of conveyed articles.

5. A conveyor as in claim 4, wherein the retractable assembly comprises a cradle and the retractable element comprises a roller rotatably supported in the cradle and wherein the bearing member bears against the cradle to urge a portion of the circumference of the roller from the first retracted position to the second salient position to present a rolling support surface to conveyed articles.

6. A conveyor as in claim 5, wherein the cradle is rotatably attached to the belt along a first axis of rotation and the roller is rotatably supported in the cradle along a second axis of rotation parallel to the first axis of rotation.

7. A conveyor as in claim 5, wherein the cradle is rotatably attached to the belt along a first axis of rotation and the roller is rotatably supported in the cradle along a second axis of rotation perpendicular to the first axis of rotation.

8. A conveyor as in claim 5, wherein the cradle includes a camming surface beneath the roller and wherein the bearing member bears against the camming surface to urge the roller into the second salient position.

9. A conveyor as in claim 4, wherein the retractable assembly comprises braces and the retractable element comprises a roller rotatably supported in the braces and wherein the bearing member bears against the circumference of the roller to urge a radially opposite portion of the circumference of the roller from the first retracted position to the second salient position to present the roller circumference to conveyed articles and to actively rotate the roller to cause conveyed articles to separate from each other along the conveying surface.

10. A conveyor as in claim 4, wherein the retractable assembly comprises a camming surface extending below the inner surface of the belt and wherein the bearing member comprises a flat wearstrip surface supporting the inner surface of the belt, the wearstrip surface bearing against the retractable assembly to urge the retractable element into the second salient position.

11. A conveyor as in claim 10, wherein the wearstrip surface includes a sloping portion to gradually bear against the camming surface.

12. A conveyor as in claim 4, further comprising a mechanism for moving the bearing member toward and away from the inner surface of the belt into and out of contact with the retractable assembly.

13. A conveyor as in claim 12, wherein the mechanism comprises a bladder and a controllable source of air to expand the bladder against the bearing member to move the bearing member into contact with the retractable assembly and to allow the bladder to collapse to keep the bearing member out of contact with the retractable assembly.

14. A conveyor as in claim 12, wherein the mechanism comprises a cylinder attached in the frame and including a movable rod coupled to the bearing member to move the bearing member into and out of contact with the retractable assembly.

15. A conveyor as in claim 4, wherein the retractable assembly comprises a shoe including non-rolling upper shoe structure and wherein the bearing member bears against the retractable assembly to urge the non-rolling upper shoe structure from the first retracted position to the second salient position to support conveyed articles in non-rolling contact.

16. A conveyor as in claim 4, wherein the retractable assembly further comprises a pivotable camming member extending below the inner surface of the belt and wherein the camming member pivots into the opening as it bears against the bearing member to urge the retractable element into the second salient position.

17. A conveyor as in claim 16, wherein the pivotable camming member comprises an arm including a pivot at one end and first and second camming surfaces at an opposite second end, the first camming surface bearing against the bearing, member and the second camming surface bearing against the retractable element.

18. A conveyor as in claim 4, wherein the retractable member is a ball rotatably retained in the retractable assembly.

19. A conveyor as in claim 4, further comprising biasing means for biasing the retractable element toward the first retracted position.

20. A conveyor as in claim 4, wherein the outer conveying surface is made of a high-friction material and wherein the retractable element in the second salient position presents a rolling surface above the high-friction outer conveying surface.

21. A conveyor as in claim 4, further comprising a rack of predetermined length in the direction of belt travel and supported in the conveyor frame proximate the inner surface of the belt, and wherein the retractable assembly further comprises a wheel extending beneath the inner surface of the belt to engage the rack, the motion of the belt causing the wheel and the retractable element to rotate about an axis normal to the conveying surface as the wheel rides along the rack, the predetermined length of the rack determining the extent of rotation of the retractable element.

22. A conveyor as in claim 21 wherein the rack includes a set of rack teeth along its length and wherein the wheel includes a set of circumferentially arranged gear teeth that mesh with the rack teeth to rotate the retractable member to a predetermined orientation.

23. A conveyor for conveying articles along a conveying path, comprising:
a conveyor frame;
a conveyor belt, including:
a series of rows of belt modules, each row extending along the conveying path from a first end to a second end and extending across the width of the belt from a first side edge to second side edge, each row including a first group of hinge elements at the first end of the row and a second group of hinge elements at the second end of the row, the first group of hinge elements circumscribing apertures aligned across the width of the belt and the second group of hinge elements circumscribing apertures aligned along the width of the belt, the first group of hinge elements along a row being interleaved with the second group of hinge elements of an adjacent row;
a plurality of hinge pins extending through the aligned apertures of interleaved hinge elements to hingedly link consecutive rows of belt modules into a conveyor belt having an upper conveying surface and an opposite inner surface;
selected ones of the belt modules forming an opening extending between the upper conveying, surface and the opposite inner surface; and
a retractable assembly including a retractable element movable from a first retracted position within the opening below the conveying surface to a second salient position above the conveying surface;
drive means supported by the frame for driving engagement with the conveyor belt; and
a bearing member supported in the conveyor frame proximate the inner surface of the belt alone at least a length of the conveying path, the bearing member bearing against the retractable assembly to urge the retractable clement from the first retracted position to the second salient position above the conveying surface in underlying support of conveyed articles.

24. A conveyor as in claim 23, wherein the retractable assembly comprises a cradle and the retractable element comprises a roller rotatably supported in the cradle and wherein the bearing member bears against the cradle to urge a portion of the circumference of the roller from the first retracted position to the second salient position to present a rolling support surface to conveyed articles.

25. A conveyor as in claim 24, wherein the cradle includes aligned eyes at one end to interfit with the interleaved hinge elements and to admit a hinge pin therethrough to form a pivot axle for the cradle.

26. A conveyor as in claim 23, wherein the retractable assembly comprises braces and the retractable element comprises a roller rotatably supported in the braces and wherein the bearing member bears against the circumference of the roller to urge a radially opposite portion of the circumference of the roller from the first retracted position to the second salient position to present the roller circumference to conveyed articles and to actively rotate the roller to cause conveyed articles to separate from each other along the conveying surface.

27. A conveyor as in claim 26, wherein one end of each brace interfits with a group of interleaved hinge elements and forms a hole to admit a hinge pin through the end about which the brace pivots.

28. A conveyor as in claim 23, wherein the retractable assembly comprises a shoe including non-rolling upper shoe structure and wherein the bearing, member bears against the retractable assembly to urge the non-rolling upper shoe structure from the first retracted position to the second salient position to support conveyed articles in non-rolling contact.

29. A conveyor as in claim 28, wherein the upper shoe structure is made of a high-friction material.

30. A conveyor as in claim 28, wherein the shoe has a passageway through one end to admit one of the hinge pins about which the shoe pivots.

31. A conveyor as in claim 23, further comprising biasing means to bias the retractable element toward the first retracted position.

32. A conveyor as in claim 23, wherein the retractable assembly further comprises a pivotable camming member including a first end pivotally encircling a hinge pin and a second camming end that pivots into the opening as it bears against the bearing member to urge the retractable element into the second salient position.

33. A conveyor belt for conveying articles, including:
   a series of rows of belt modules, each row extending along a conveying path from a first end to a second end and extending across the width of the belt from a first side edge to second side edge, each row including a first group of hinge elements at the first end of the row and a second group of hinge elements at the second end of the row, the first group of hinge elements circumscribing apertures aligned across the width of the belt and the second group of hinge elements circumscribing apertures aligned along the width of the belt, the first group of hinge elements along a row being interleaved with the second group of hinge elements of an adjacent row;
   a plurality of hinge pins extending through the aligned apertures of interleaved hinge elements to hingedly link consecutive rows of belt modules into a conveyor belt having an upper conveying surface and an opposite inner surface;
   selected ones of the belt modules forming an opening extending between the upper conveying surface and the opposite inner surface; and
   a retractable assembly including a retractable element movable from a first retracted position within the opening below the conveying surface to a second salient position above the conveying surface in underlying support of conveyed articles.

34. A conveyor belt as in claim 33, further including a layer of high-friction material forming at least a portion of the conveying surface.

35. A conveyor belt as in claim 33, wherein the retractable assembly pivots about a hinge pin.

36. A conveyor belt as in claim 33, wherein the retractable element is a roller.

37. A conveyor belt as in claim 33, wherein the retractable element is a rotatable ball.

38. A conveyor belt as in claim 33, wherein the retractable assembly comprises a pivotable shoe including an upper high-friction surface.

39. A conveyor belt as in claim 33, further comprising biasing means for biasing the retractable element toward the first retracted position.

40. A conveyor belt as in claim 33, wherein the opening extends to the first end of the belt row and the retractable assembly includes a passageway aligned with the apertures in the first group of hinge elements to admit a hinge pin therethrough, whereby the retractable assembly pivots about the hinge pin.

41. A conveyor for conveying articles along a conveying path, comprising:
   a conveyor frame;
   a driven conveyor belt supported in the conveyor frame and including:
      an outer conveying surface and an opposite inner surface and forming an opening onto the outer conveying surface; and
      a rotatable assembly rotatable about an axis normal to the outer conveying surface, the rotatable assembly including an article-supporting element and a rotational element disposed beneath the inner surface of the belt and linked to the article-supporting element; and;
   rotation control element supported in the frame beneath the inner surface of the belt in a position to rotate the rotational element and thereby the article-supporting element as the belt is driven past.

42. A conveyor as in claim 41, wherein the article-supporting, element is a cylindrical roller.

43. A conveyor as in claim 41, wherein the rotatable assembly is retractable from a first position in which the article-supporting element is beneath the outer conveying surface to a second salient position in which the article-supporting element is at least partly above the conveying surface to support conveyed articles.

44. A conveyor as in claim 41, wherein the length of the rotation control element determines the degree of rotation of the rotatable assembly.

45. A conveyor as in claim 38, wherein the rotational element comprises a wheel.

46. A conveyor as in claim 45, wherein the rotation control element is a rack gear with teeth and wherein the periphery of the wheel includes teeth for meshing with the teeth of the rack gear to rotate the rotatable assembly.

47. A conveyor for conveying articles along a conveying path, comprising:
   a conveyor frame;
   a driven belt supported in the frame and including a plurality of article-supporting elements having changeable characteristics relative to the articles conveyed on the felt;
   one or more adjustment control elements supported in the conveyor frame in a position to alter the characteristics of the article-supporting elements as the belt is running to provide different conveying characteristics to articles supported by the article-supporting elements in zones defined by the positions of the adjustment control elements along the conveying path.

48. A conveyor as in claim 47 wherein the one or more adjustment control elements move the article-supporting elements between a retracted position out of contact with conveyed articles and a salient position in supporting contact with conveyed articles.

49. A conveyor as in claim 47 wherein the article-supporting, elements comprise rollers and wherein the driven belt further includes brake members moved by contact with the adjustment control elements from a retracted position out of engagement with the article-supporting elements into a braking position preventing the article-supporting elements from moving.

50. A conveyor as in claim 49 wherein the brake members engage the rollers in frictional contact to prevent the rollers from rolling.

51. A conveyor as in claim 49 wherein the rollers include a gear wheel and the brake members include gear teeth that mesh with the gear wheel to prevent the rollers from rolling.

* * * * *